(12) United States Patent
Jang et al.

(10) Patent No.: US 10,901,483 B2
(45) Date of Patent: Jan. 26, 2021

(54) DISPLAY DEVICE AND METHOD FOR CONTROLLING DISPLAY DEVICE

(71) Applicant: SAMSUNG ELECTRONICS CO., LTD., Suwon-si (KR)

(72) Inventors: Du Hee Jang, Suwon-si (KR); Jeong Il Kang, Yongin-si (KR); Seong Hoon Woo, Suwon-si (KR); Shin Wook Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/481,985

(22) PCT Filed: Jan. 17, 2018

(86) PCT No.: PCT/KR2018/000781
§ 371 (c)(1),
(2) Date: Jul. 30, 2019

(87) PCT Pub. No.: WO2018/143582
PCT Pub. Date: Aug. 9, 2018

(65) Prior Publication Data
US 2020/0042071 A1    Feb. 6, 2020

(30) Foreign Application Priority Data
Jan. 31, 2017    (KR) .................. 10-2017-0013744

(51) Int. Cl.
*G06F 1/3218*    (2019.01)
*G06F 1/26*    (2006.01)
(Continued)

(52) U.S. Cl.
CPC ............ *G06F 1/3218* (2013.01); *G06F 1/266* (2013.01); *G06F 1/28* (2013.01); *G09G 3/20* (2013.01); *G09G 2330/021* (2013.01)

(58) Field of Classification Search
CPC .......... G06F 1/3218; G06F 1/266; G06F 1/28; G06F 1/3265; G06F 1/3296; G09G 3/20; G09G 2330/021; G09G 2330/028
See application file for complete search history.

(56) References Cited

U.S. PATENT DOCUMENTS 6,232,964 B1 *    5/2001    Lee ........................ G09G 1/16
                                                                345/212
8,278,900 B2    10/2012    Strijker et al.
(Continued)

FOREIGN PATENT DOCUMENTS

JP    2010-206941    9/2010
JP    2014-093528    5/2014
(Continued)

OTHER PUBLICATIONS

International Search Report for PCT/KR2018/000781 dated May 29, 2018, 5 pages.
(Continued)

*Primary Examiner* — Kent W Chang
*Assistant Examiner* — Andrew Lee
(74) *Attorney, Agent, or Firm* — Nixon & Vanderhye, P.C.

(57) ABSTRACT

An electronic device according to an embodiment the disclosure may include a display, a processor, and a power supply unit supplying power to the display and the processor. The power supply unit may include a power receiving unit receiving AC power from an external power source, a rectifying unit rectifying the AC power to convert the AC power to DC power, and a power factor correction unit adjusting a power factor of the DC power based on voltage at a specified point of the power supply unit and outputting voltage of the DC power to be output to the display, and the processor may be configured to identify power consumption of the display and to turn on or off the power factor (Continued)

correction unit based on the identified power consumption of the display. Moreover, various embodiment grasped through the disclosure are possible.

14 Claims, 7 Drawing Sheets

(51) Int. Cl.
*G06F 1/28* (2006.01)
*G09G 3/20* (2006.01)

(56) References Cited

U.S. PATENT DOCUMENTS

| | | |
|---|---|---|
| 9,055,645 B2 | 6/2015 | Kwon et al. |
| 2011/0095730 A1 | 4/2011 | Strijker et al. |
| 2011/0254878 A1* | 10/2011 | Mori .................... G09G 3/2007 345/690 |
| 2013/0169517 A1* | 7/2013 | Cho .................... G09G 3/3208 345/82 |
| 2014/0125238 A1 | 5/2014 | Kwon et al. |

FOREIGN PATENT DOCUMENTS

| | | |
|---|---|---|
| JP | 2014-204643 | 10/2014 |
| KR | 2003-0021947 | 3/2003 |
| KR | 2005-0041148 | 5/2005 |

OTHER PUBLICATIONS

Written Opinion of the ISA for PCT/KR2018/000781 dated May 29, 2018, 5 pages.

\* cited by examiner

DISPLAY DEVICE AND METHOD FOR CONTROLLING DISPLAY DEVICE This application is the U.S. national phase of International Application No. PCT/KR2018/000781 filed 17 Jan. 2018, which designated the U.S. and claims priority to KR Patent Application No. 10-2017-0013744 filed 31 Jan. 2017, the entire contents of each of which are hereby incorporated by reference.

TECHNICAL FIELD

The disclosure relates to a display device that turns on or off a power factor correction unit depending on the power consumption of the display, and a controlling method of the display device.

DESCRIPTION OF RELATED ART

A display device refers to a device displaying the image received from the outside or the image stored in an internal storage device. The display panel included in the display device may include a light emitting device such as an light emitting diode (LED), an organic light emitting diode (OLED), or the like for displaying an image by emitting light.

The power supply device may supply the power necessary to operate the display device. The power supply device may convert the power received from external power source to supply the converted power to a display. The power supply device may convert alternating current (AC) power received from external power source to direct current (DC) power to supply the converted DC power to the display.

When converting the AC power to the DC power, the power supply device may improve the power factor of the power supplied to the display device. The power supply device may improve the power factor of the received power to increase the efficiency of the power received by the display device.

When supplying power to each component of a display device, the display device may correct the power factor of the power supplied by the external power source and then may supply the power. When the display device corrects the power factor of the supplied power, the efficiency of the power supplied to the display device may be reduced, but the efficiency of the power received by the display device via the external power source may increase. However, when the display device consumes low-power, the effect that the efficiency of the received power increases may not be great. As such, when the display device consumes low-power in the display, the efficiency of the supplied power may be reduced.

SUMMARY

Various embodiments of the disclosure provides a display device that increases the efficiency of the supplied power by not allowing the power factor of the supplied power to be corrected when a display consumes low power with the little effect on power factor correction, and a controlling method of the display device.

An electronic device according to the disclosure may include a display, a processor, and a power supply unit supplying power to the display and the processor. The power supply unit may include a power receiving unit receiving AC power from an external power source, a rectifying unit rectifying the AC power to convert the AC power to DC power, and a power factor correction unit adjusting a power factor of the DC power based on voltage at a specified point of the power supply unit and outputting voltage of the DC power to be output to the display, and the processor may be configured to identify power consumption of the display and to turn on or off the power factor correction unit based on the identified power consumption of the display.

A method according to the disclosure may include identifying power consumed by a display and turning on or off a power factor correction unit based on the identified power consumption of the display.

A display device of the disclosure and a controlling method of the display device may supply power to a display without adjusting the power factor of power supplied to the display by turning off a power factor correction unit when a display consumes low power with the little effect on power factor correction, thereby increasing the efficiency of the supplied power.

Furthermore, a resistor and a switch capable of controlling the current flowing into the resistor are connected to the output terminal of the power factor correction unit of the display device, and then the resistor and the switch are connected to the output terminal of the power factor correction unit only when the external power source starts to apply power, thereby preventing inrush current from occurring and preventing power from being unnecessarily consumed.

Besides, a variety of effects directly or indirectly understood through this disclosure may be provided.

DETAILED DESCRIPTION OF EXAMPLE EMBODIMENTS

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure. With regard to description of drawings, similar components may be marked by similar reference marks/numerals.

Figure 1:
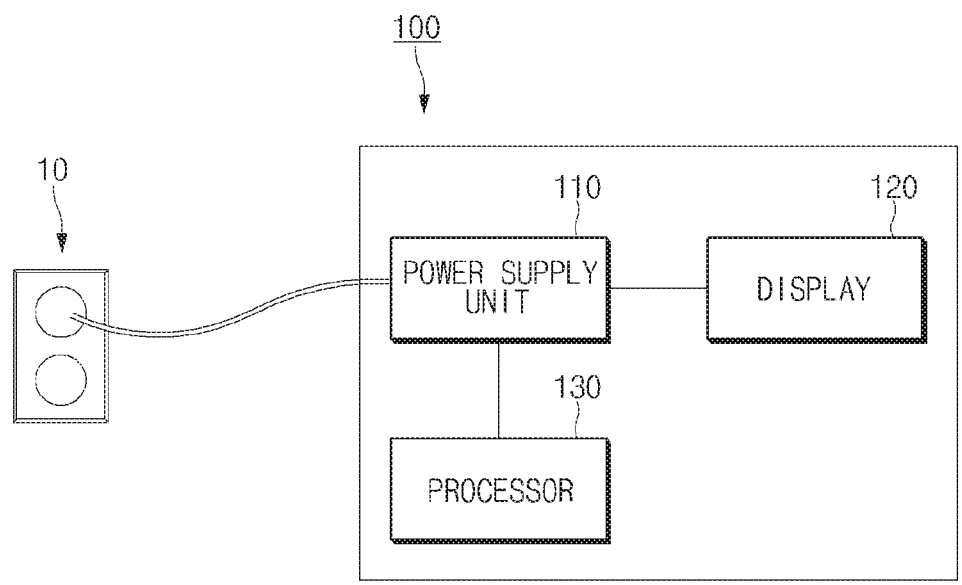
FIG. 1 is a view illustrating how a display device is connected to an external power source, according to various embodiments of the disclosure.

FIG. 1 is a view illustrating how a display device is connected to an external power source, according to various embodiments of the disclosure.

Referring to FIG. 1, a display device 100 may include a power supply unit 110, a display 120, and a processor 130.

According to an embodiment, the power supply unit 110 may receive power from an external power source 10 to supply necessary power to each component (e.g., the display 120, the processor 130, or the like) of the display device 100. For example, the power supply unit 110 may convert AC power to DC power by rectifying the AC power received from the external power source 10. The power supply unit 110 may supply the converted DC power to each of the components.

According to an embodiment, the power supply unit 110 may adjust the power factor of power supplied to each of the components of the display device 100. For example, the power supply unit 110 may adjust (or corrects the power factor) the power factor of the DC power supplied to the components to be close to '1'.

The display 120 may display an image (or a video image). For example, the display 120 may include a liquid crystal display (LCD) panel to display an image. The LCD panel may adjust the transparency of the LCD and may display an image by transmitting the light emitted from the backlight to the LCD. For example, the backlight may be one of light emitting diode (LED), cold cathode fluorescent lamp (CCFL), hot cathode fluorescent lamp (HCFL), surface-conduction electron-emitter display (SED), and field emission display (FED). The LCD panel may include a driving unit for driving the backlight. For another example, the display 120 may include an OLED panel to display an image. The OLED panel may emit OLED itself to display an image. For example, the OLED panel may include a driving unit for driving the OLED. For another example, the display 120 may include a plasma display panel (PDP) panel to display an image. The PDP panel may induce a plasma phenomenon by applying a voltage to an electrode connected to a gas (e.g., neon or argon) tube and may display an image.

According to an embodiment, the display 120 may display an image by consuming different power. For example, the display 120 may display an image by generally consuming the power of a specified value or more. For example, the specified value may be a power value with the little effect on power factor correction. For another example, the display 120 may display an image by consuming the power (or low-power) of less than a specified value in the specified case. For example, the display 120 may display an image by consuming the power of less than a specified value, when displaying an image with the brightness (or low brightness) of a specified value or less. For another example, the display 120 may consume the power of less than a specified value when displaying an image for protecting the display 120. According to an embodiment, the processor 130 may control overall operations of the display device 100. For example, the processor 130 may control the power supply unit 110 and the display 120 to display an image on the display 120. According to an embodiment, the processor 130 may receive power from the power supply unit 110 to control the display device 100.

According to an embodiment, the processor 130 may control the power supply unit 110 to supply the power to the display 120. For example, the processor 130 may supply different power to the display 120 depending on the operating state of the display 120. For example, when generally displaying an image on the display 120, the processor 130 may supply the power of a specified value or more to the display 120. For another example, when displaying an image on the display 120 in the specified case, the processor 130 may supply the power of less than a specified value to the display 120.

According to an embodiment, the processor 130 may control the display 120 to display the image. For example, the processor 130 may display an image that consumes the power of a specified value or more on the display 120, on the display 120. For example, when generally displaying an image on the display 120, the display 120 may consume an image of a specified value or more. For another example, the processor 130 may display an image that consumes the power of less than the specified value on the display 120, on the display 120. For example, when displaying an image on the display 120 in the specified case, the display 120 may consume the power of less than a specified value.

When supplying power to each component of the display device 100, the display device 100 may correct the power factor of the power supplied by the external power source 10 and then may supply the power. When the display device 100 corrects the power factor of the supplied power, the efficiency of the power supplied to the display device 100 may be reduced, but the efficiency of the power received by the display device 100 via the external power source 10 may increase. However, when the display device 100 consumes low-power, the effect that the efficiency of the received power increases may not be great. As such, when the display device 100 consumes low-power in the display 120, the efficiency of the supplied power may be reduced. The display device 100 according to various embodiments of the disclosure may increase the efficiency of the supplied power by not allowing the power factor of the supplied power to be corrected when a display consumes low power with the little effect on power factor correction.

Figure 2A:
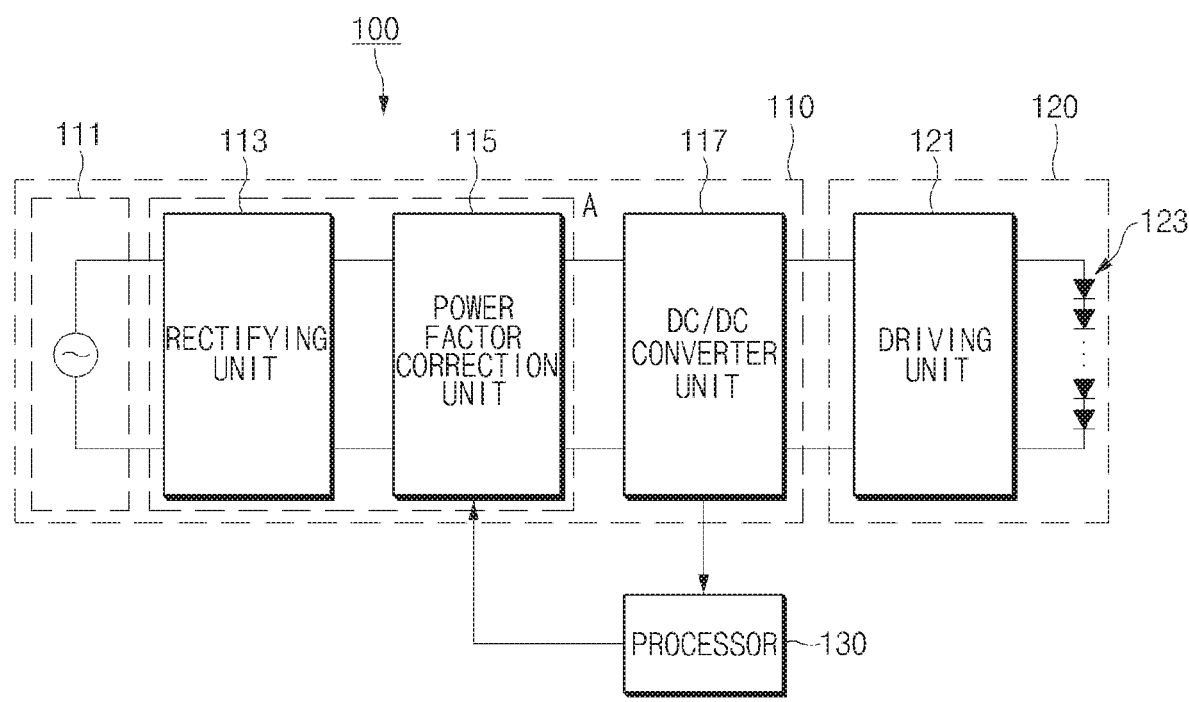
FIG. 2A is a block diagram illustrating a configuration of a display device, according to an embodiment of the disclosure.

FIG. 2A is a block diagram illustrating a configuration of a display device, according to an embodiment of the disclosure.

Referring to FIG. 2A, the display 100 may include the power supply unit 110, the display 120, and the processor 130.

According to an embodiment, the power supply unit 110 may include a power receiving unit 111, a rectifying unit 113, a power factor correction unit 115, and a DC/DC converter unit 117. The power supply unit 110 may supply the DC power necessary for the display 120 and the processor 130.

According to an embodiment, the power receiving unit 111 may receive power from the external power source 10. For example, the power receiving unit 111 may receive AC power from the external power source 10.

According to an embodiment, the rectifying unit 113 may rectify the received AC power to convert the AC power to DC power. According to an embodiment, the rectifying unit 113 may include a circuit for rectifying the AC power. For example, the rectifying unit 113 may include a bridge circuit (e.g., a bridge diode circuit) that rectifies the received AC power to convert the AC power to the DC power.

According to an embodiment, the power factor correction unit 115 may adjust the power factor of the DC power based on the voltage of a specified point of the power supply unit 110 and may output the voltage of the DC power.

According to an embodiment, the power factor correction unit 115 may be turned on or off. For example, when the power factor correction unit 115 is turned on, the power factor correction unit 115 may adjust the power factor of the DC power and may adjust and output the output voltage of the DC power, the power factor of which is adjusted. For another example, when the power factor correction unit 115 is turned off, the power factor correction unit 115 may output the voltage of the DC power input to the power factor correction unit 115.

According to an embodiment, the DC/DC converter unit 117 may convert DC voltage into a specified gain. For example, when the power factor correction unit 115 is turned off, the DC/DC converter unit 117 may convert the DC voltage output from the rectifying unit 113, into the specified gain. For another example, when the power factor correction unit 115 is turned on, the DC/DC converter unit 117 may convert the DC voltage output from the power factor correction unit 115, into the specified gain. For example, the specified gain may be determined by the voltage necessary to drive the display 120 and the processor 130. According to an embodiment, the DC/DC converter unit 117 may output the converted voltage to the display 120 and the processor 130. According to an embodiment, when the voltage output by the power factor correction unit 115 does not need to be converted into the specified gain, the DC/DC converter unit 117 may be omitted. For example, when the voltage output by the power factor correction unit 115 has a magnitude the same as the magnitude of the voltage necessary for each component of the display device 100, there is no need to be converted into the specified gain.

The display 120 may include a driving unit 121 and a panel unit 123. The display 120 may display an image.

The driving unit 121 may supply driving current for the panel unit 123 to display an image. For example, the driving unit 121 may receive a signal (e.g., a dimming signal) for displaying an image and may supply the current corresponding to the received signal to the panel unit 121.

The panel unit 123 may receive driving current to display an image. For example, the panel unit 123 may operate a backlight, using the driving current. The light emitted from the backlight may pass through the LCD to display an image. For another example, the panel unit 123 may display the image by operating the self-emitting OLED panel using the driving current.

The processor 130 may turn on or off the power factor correction unit 115. For example, the processor 130 may identify the power consumption of the display 120 and may turn on or off the power factor correction unit 115 based on the power consumption. For example, when the display 120 consumes the power of less than a specified value, the processor 130 may turn off the power factor correction unit 115 and may supply the DC power output by the rectifying unit 113, to the display 120. For another example, when the display 120 consumes the power of the specified value or more, the processor 130 may turn on the power factor correction unit 115 to correct the power factor of the DC power output by the rectifying unit 113 and may supply the DC power, the power factor of which is corrected, to the display 120. The specified value may be a power value with the little effect on power factor correction.

Figure 2B:
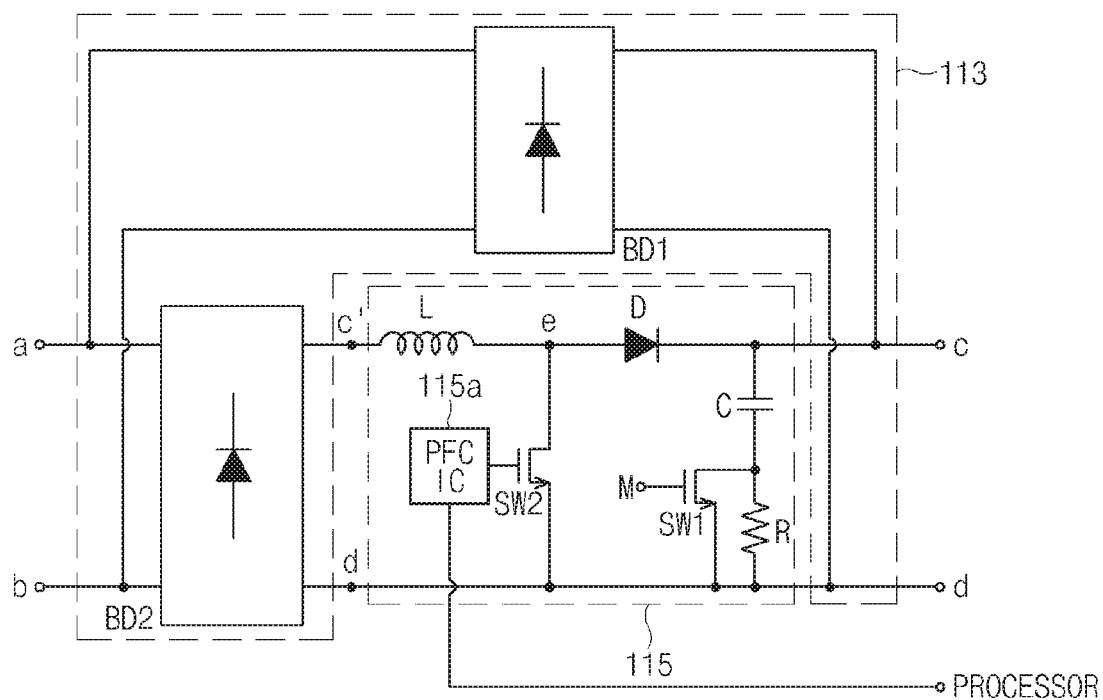
FIG. 2B is a view illustrating a circuit diagram of portion A of FIG. 2A.

FIG. 2B is a view illustrating a circuit diagram of portion A of FIG. 2A.

Referring to FIG. 2B, the rectifying unit 113 and the power factor correction unit 115 may receive the AC power from the power receiving unit 111 via node "a" and node "b" and may output the DC power via node "c" and node "d".

The rectifying unit 113 may include a first rectifying circuit BD1 and a second rectifying circuit BD2. For example, each of the first rectifying circuit BD1 and the second rectifying circuit BD2 may include a bridge diode circuit. The first rectifying circuit BD1 may be connected between the power receiving unit 111 and the output terminal (or node "c" and node "d") of the power factor correction unit 115; the second rectifying circuit BD2 may be connected between the power receiving unit 111 and the input terminal (or node "c'" and node "d") of the power factor correction unit 115.

According to an embodiment, the rectifying unit 113 may supply the power received via the power receiving unit 111, to the display 120 via the first rectifying circuit BD1 or the second rectifying circuit BD2. For example, when the power factor correction unit 115 is turned off, the rectifying unit 113 may convert the received AC power to DC power via the first rectifying circuit BD1 to supply the DC power to the display 120. For another example, when the power factor correction unit 115 is turned on, the rectifying unit 113 may supply the received power to the display 120 via the second rectifying circuit BD2 and the power factor correction unit 115.

The power factor correction unit 115 may include an inductor L, a diode D, a capacitor C, a resistor R, a first switch SW1, a second switch SW2, and a switch control unit 115a.

According to an embodiment, the inductor L may be connected between node "c'" and node "e" of the power factor correction unit 115. According to an embodiment, the inductor L may be charged by the power input from the rectifying unit 113.

According to an embodiment, the diode D may be connected between node "e" and node "c" such that current flows from node "e" to node "c". According to an embodiment, the diode D may allow current to flow from the inductor L storing energy to the capacitor C. The capacitor C may be charged by the current.

According to an embodiment, the capacitor C may be connected between output terminals. According to an embodiment, the capacitor C may be charged by the supplied power, and the voltage of the charged capacitor C may be output to the output terminal of the power factor correction unit 115.

According to an embodiment, the resistor R may be connected between output terminals and may be connected to the capacitor C in series. For example, the resistor R may be a thermistor; the value of which is changed depending on the applied voltage. When the power supply unit 110 starts to receive power from the external power source 10, instantaneously increased current (or inrush current) may flow into the power supply unit 110. The resistor R may be connected to the output terminal of the power factor correction unit 115 to prevent the inrush current from occurring. Furthermore, the capacitor C may be charged to the specified voltage by the current flowing into the resistor R.

According to an embodiment, when a first switch SW1 is connected to the resistor R and is turned off depending on signal M input to a gate, the current may flow into the resistor R; when the first switch SW1 is turned on, the current may not flow into the resistor R. For example, the voltage at the specified point of the power supply unit 110 may be input to the gate of the first switch SW1 and then the first switch SW1 may be turned on or off. For example, when the output voltage of the power factor correction unit 115 is less than a specified value, the first switch SW1 may be turned off. For example, when the output voltage of the power factor correction unit 115 is not less than the specified value, the first switch SW1 may be turned on. The specified value may be a voltage value for operating the display 120.

According to an embodiment, the second switch SW2 may be connected between node "e" and node "d" to control the current flowing from the inductor L to the capacitor C. According to an embodiment, a control signal may be input from the switch control unit 115*a* to the gate of the second switch SW2 and the second switch SW2 may be turned on or off.

According to an embodiment, the switch control unit 115*a* may input the control signal to the gate of the second switch SW2 to turn on or off the second switch SW2. For example, the switch control unit 115*a* may turn on or off the second switch SW2 depending on the duty ratio determined based on the voltage of the specified point of the power supply unit 110. For example, the voltage at the specified point may be the output voltage of the power factor correction unit 115. The switch control unit 115*a* may turn on or off the second switch SW2 depending on the duty ratio determined based on the output voltage of the power factor correction unit 115.

According to an embodiment, the processor 130 may turn on or off the switch control unit 115*a* depending on the power consumed by the display 120. In other words, the processor 130 may control (e.g., turn on or off) the signal output by the switch control unit 115*a*, depending on the power consumed by the display 120. For example, when the switch control unit 115*a* is turned off, the DC power supplied from the rectifying unit 111 may be input to the display 120 via the first rectifying circuit BD1. For another example, when the switch control unit 115*a* is turned on, the DC power supplied from the rectifying unit 111 may be input to the display 120 via the second rectifying circuit BD2 and the power factor correction unit 115. The power transmitted to the display 120 as the processor 130 turns on or off the switch control unit 115*a* will be described with reference to FIGS. 3 to 5.

Figure 3:
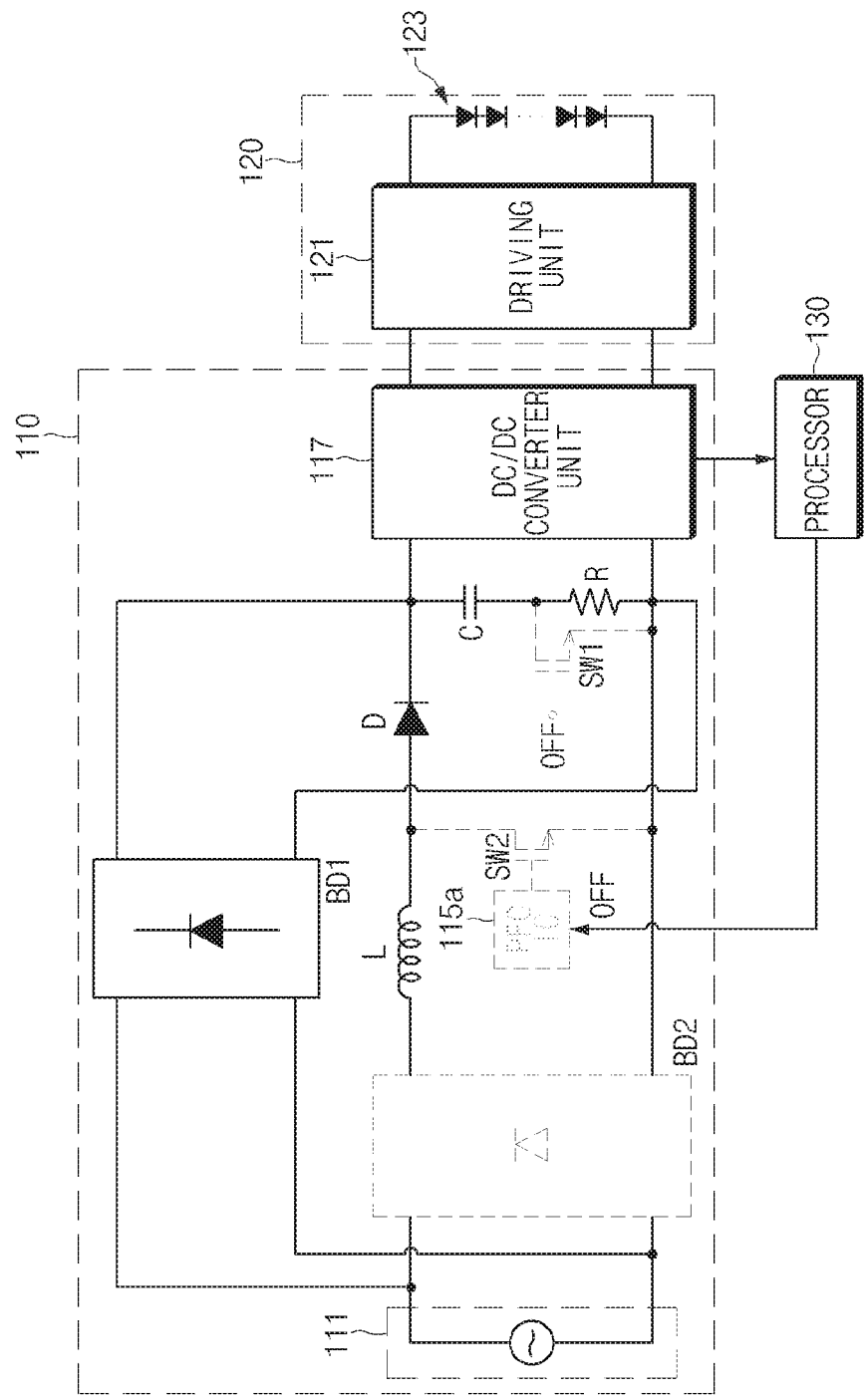
FIG. 3 is a view illustrating a state where an external power source starts to be connected to a display device, according to an embodiment of the disclosure.

FIG. 3 is a view illustrating a state where an external power source starts to be connected to a display device, according to an embodiment of the disclosure.

Referring to FIG. 3, the power from the external power source 10 may start to be applied to the display device 100. When the power starts to be applied from the external power source 10 to the display device 100, instantaneously increased current (or inrush current) may flow into the power supply unit 110.

According to an embodiment, the processor 130 may identify the power consumption of the display 120. For example, because the display 120 is in a state before operation, the display 120 may consume the power of less than a specified value. As such, the processor 130 may turn off the switch control unit 115*a* of the power factor correction unit 115.

According to an embodiment, the power received from the external power source 10 may be supplied to the display 120 via the first rectifying circuit BD1. For example, the received AC voltage from the external power source 10 may be converted to DC voltage via the first rectifying circuit BD1 and may be transmitted to the output terminal of the power factor correction unit 115.

According to an embodiment, the first switch SW1 may be turned off based on the output voltage of the power factor correction unit 115. For example, when the output voltage of the power factor correction unit 115 is less than a specified value, the first switch SW1 may be turned off. As such, the resistor R may be connected to the output terminal of the power factor correction unit 115 to prevent inrush current from occurring. Furthermore, the current may flow into the resistor R by the power transmitted to the output terminal of the power factor correction unit 115. As such, the capacitor C may be charged by the current flowing into the resistor R.

According to an embodiment, when the output voltage of the power factor correction unit 115 is not less than a specified value, the processor 130 may turn on the power factor correction unit 115 of the power supply unit 110 to display an image on the display 120. According to an embodiment, when the output voltage of the power factor correction unit 115 is not less than the specified value, the first switch SW1 may be turned on. As such, the display device 100 may display an image on the display 120.

Figure 4:
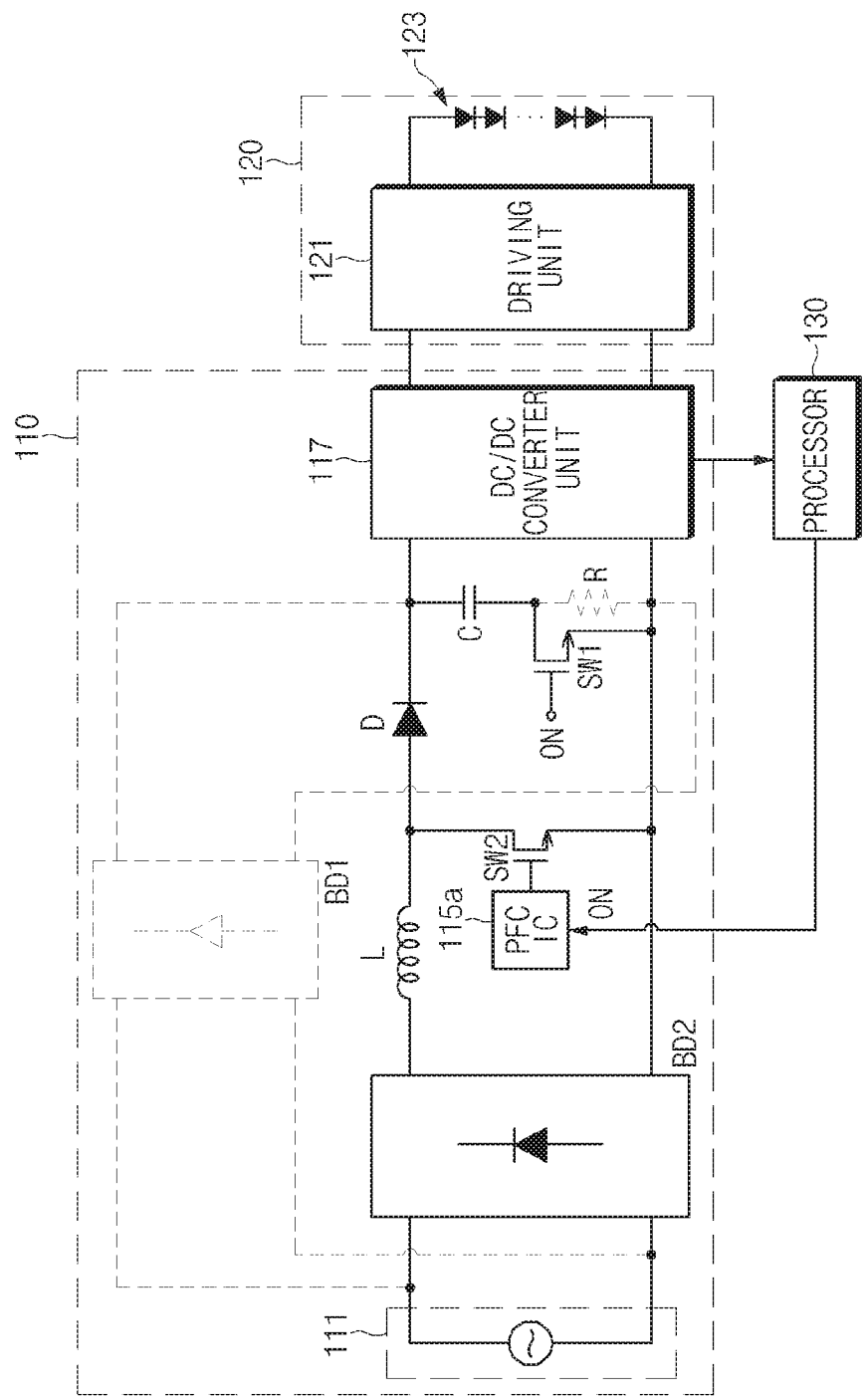
FIG. 4 is a view illustrating a state where a display device generally displays an image on a display, according to an embodiment of the disclosure.

FIG. 4 is a view illustrating a state where a display device generally displays an image on a display, according to an embodiment of the disclosure.

Referring to FIG. 4, the display device 100 may consume the power of a specified value or more and may display the image on the display 120. For example, when generally displaying an image, the display 120 may consume the power of a specified value or more.

According to an embodiment, the power received from the external power source 10 after the power factor correction unit 115 is turned on may be input to the power factor correction unit 115 via the second rectifying circuit BD2. For example, the received AC voltage from the external power source 10 may be converted to DC voltage via the second rectifying circuit BD2 and may be input to the input terminal of the power factor correction unit 115.

According to an embodiment, the processor 130 may turn on or off the second switch SW2 of the power factor correction unit 115 to adjust the power factor of the input DC voltage and may output the voltage, the power factor of which is adjusted. For example, the DC voltage input to the power factor correction unit 115 may charge the inductor L. When the second switch SW2 is turned on, the energy stored in the inductor L may be transmitted to the capacitor C. In other words, when the second switch SW2 is turned on, the current may flow from the inductor L storing the energy to the capacitor C and then the capacitor C may be charged. As such, the power factor correction unit 115 may output the voltage of the charged capacitor C. According to an embodiment, the switch control unit 115*a* may turn on or off the second switch SW2 depending on the duty ratio determined based on the output voltage of the power factor correction unit 115.

According to an embodiment, the output voltage of the power factor correction unit 115 may be input to the DC/DC converter unit 117 to be converted into a specified gain, and then may be output to the display 120. As such, the display 120 may receive the voltage, may consume the power of a specified value or more, and may display an image on a display.

Figure 5:
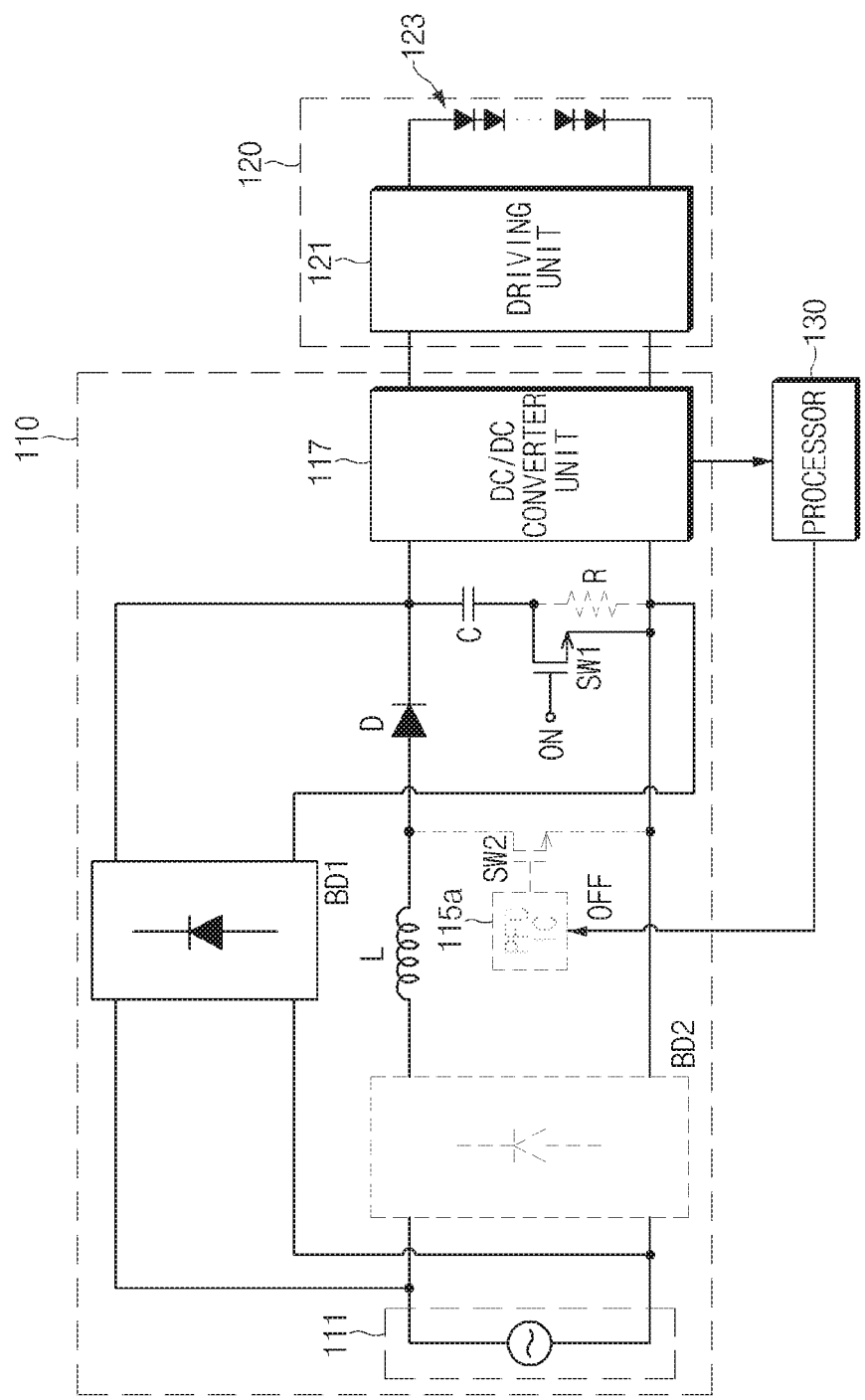
FIG. 5 is a view illustrating a state where a display device displays an image on a display in a specified case, according to an embodiment of the disclosure.

FIG. 5 is a view illustrating a state where a display device displays an image on a display in a specified case, according to an embodiment of the disclosure.

Referring to FIG. 5, the display device 100 may consume the power of less than a specified value and may display the image on the display 120.

According to an embodiment, the processor 130 may identify the power consumption of the display 120. For example, when displaying an image in the specified case, the display 120 may consume the power (or low power) of less than a specified value.

According to an embodiment, the processor 130 may identify the power consumption of the display 120. For example, the display 120 may display an image with the brightness (or low brightness) of a specified value or less or may display an image for protecting the display 120 to consume the power of less than a specified value. As such, the processor 130 may turn off the switch control unit 115*a* of the power factor correction unit 115.

According to an embodiment, the power received from the external power source 10 may be supplied to the display 120 via the first rectifying circuit BD1. For example, the received AC voltage from the external power source 10 may be converted to DC voltage via the first rectifying circuit BD1 and may be transmitted to the output terminal of the power factor correction unit 115.

According to an embodiment, the first switch SW1 may be turned on based on the output voltage of the power factor correction unit 115. For example, when the output voltage of the power factor correction unit 115 is not less than a specified value, the first switch SW1 may be turned on. As such, because the current does not flow to the resistor R, the unnecessary energy consumption may be prevented.

According to an embodiment, the power transmitted to the output terminal of the power factor correction unit 115 may charge the capacitor C to output the specified voltage. According to an embodiment, the output voltage of the power factor correction unit 115 may be input to the DC/DC converter unit 117 to be converted into a specified gain, and then may be output to the display 120. As such, the display 120 may receive the voltage, may consume the power of less than the specified value, and may display an image on a display.

According to various embodiments of the disclosure given with reference to FIGS. 1 to 5, the display device 100 may supply power to the display 120 without adjusting the power factor of power supplied to the display 120 by turning off the power factor correction unit 115 when the display 120 consumes low power with the little effect on power factor correction, thereby increasing the efficiency of the supplied power.

Furthermore, a resistor and a switch capable of controlling the current flowing into the resistor are connected to the output terminal of the power factor correction unit of the display device, and then the external power source 10 is connected to the output terminal of the power factor correction unit only when the external power source 10 starts to apply power, thereby preventing inrush current from occurring and preventing power from being unnecessarily consumed.

Figure 6:
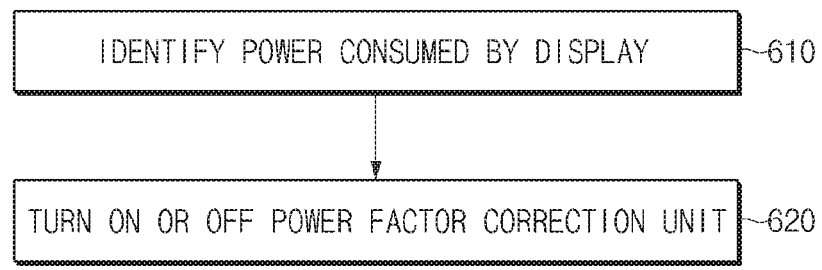
FIG. 6 is a flowchart illustrating a control method of a display device, according to various embodiments of the disclosure.

FIG. 6 is a flowchart illustrating a control method of a display device, according to various embodiments of the disclosure.

The flowchart illustrated in FIG. 6 may include operations processed by the above-described display device 100. Although omitted below, the descriptions of the display device 100 given with reference to FIGS. 1 to 5 may be applied to the flowchart illustrated in FIG. 6.

According to an embodiment, in operation 610, the display device 100 may identify the power consumed by the display 120.

According to an embodiment, in operation 620, the display device 100 may turn on or off the power factor correction unit 115 based on the power consumption of the display 120. For example, when the display 120 consumes the power (or low power) of less than a specified value, the display device 100 may turn off the power factor correction unit 115. For another example, when the display 120 consumes the power of the specified value or more, the display device 100 may turn on the power factor correction unit 115. For example, the specified value may be a power value with the little effect on power factor correction.

According to various embodiments, at least part of a device (e.g., modules or functions thereof) or a method (e.g., operations) may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical medium (e.g., a compact disc read only memory (CD-ROM) and a digital versatile disc (DVD), a magneto-optical media (e.g., a floptical disk)), an embedded memory, or the like. The one or more instructions may contain a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display device comprising:
a display;
a processor; and
a power supply configured to supply power to the display and the processor,
wherein the power supply includes:
a power receive configured to receive AC power from an external power source;
a rectifier configured to rectify the AC power to convert the AC power to DC power; and
a power factor correction circuit configured to adjust a power factor of the DC power based on voltage at a specified point of the power supply and to output voltage of the DC power to the display, and
wherein the processor is configured to:
identify power consumption of the display; and
turn on or off the power factor correction circuit based on the identified power consumption of the display,
wherein the rectifier includes a first rectifying circuit and a second rectifying circuit,
wherein, when the power factor correction circuit is turned off, power received via the power receiver is input to the display via the first rectifying circuit, and
wherein, when the power factor correction circuit is turned on, power received via the power receiver is input to the display via the second rectifying circuit and the power factor correction circuit.

2. The display device of claim 1, wherein the processor is configured to:
turn off the power factor correction circuit when the display consumes power of less than a specified value; and
turn on the power factor correction circuit when the display consumes power of the specified value or more.

3. The display device of claim 2, wherein the display is configured to:
consume power of less than the specified value, when the display displays an image with a specified brightness or less or displays an image for protecting the display.

4. The display device of claim 1, wherein each of the first rectifying circuit and the second rectifying circuit comprises a bridge diode circuit.

5. The display device of claim 1, wherein the first rectifying circuit is connected between the power receive and an output terminal of the power factor correction circuit, and
wherein the second rectifying circuit is connected between the power receiver and an input terminal of the power factor correction circuit.

6. The display device of claim 5, wherein the power factor correction circuit includes a capacitor connected to the output terminal of the power factor correction circuit, wherein when the power factor correction circuit is turned off, power input via the first rectifying circuit charges the capacitor and voltage of the charged capacitor is output, and wherein, when the power factor correction circuit is turned on, voltage input via the second rectifying circuit and the power factor correction circuit charges the capacitor and voltage of the charged capacitor is output.

7. The display device of claim 5, wherein the power factor correction circuit includes a resistor connected to the output terminal of the power factor correction circuit and a first switch connected to the resistor, and wherein the first switch is turned on or off based on voltage at a specified point of the power factor correction circuit and controls current flowing into the resistor.

8. The display device of claim 7, wherein the voltage at the specified point of the power factor correction circuit is an output voltage of the power factor correction circuit, wherein, when the output voltage of the power factor correction circuit is voltage of less than a specified value, the first switch is turned off and allows current to flow into the resistor, and wherein, when the output voltage of the power factor correction circuit is the voltage of the specified value or more, the first switch is turned on and does not allow current to flow into the resistor.

9. The display device of claim 7, wherein the resistor is a thermistor.

10. The display device of claim 1, wherein the power factor correction circuit includes a second switch for adjusting output voltage of the power factor correction circuit and a switch control for controlling the second switch, and wherein the processor is configured to:
turn on or off the power factor correction circuit by turning on or off the switch control based on the identified power consumption of the display.

11. The display device of claim 10, wherein the processor is configured to:
when the display device consumes power of less than a specified value, turn off the second switch by turning off the switch control, and wherein, when the display device consumes power of a specified value or more, turn on or off the second switch depending on a duty ratio determined based on the voltage at the specified point of the power supply, by turning on the switch control.

12. The display device of claim 1, wherein the voltage at the specified point of the power supply is output voltage of the power factor correction circuit, and wherein the power factor correction circuit is configured to:
adjust the output voltage of the DC power to be output to the display based on the output voltage.

13. The display device of claim 1, further comprising:
a DC/DC converter configured to convert DC voltage output from the rectifier or the power factor correction circuit into a specified gain and to output the converted voltage to the display.

14. A controlling method of a display device comprising:
obtaining, via a power receiver, AC power from an external power source;
rectifying, via a rectifier, the AC power to convert the AC power to DC power;
adjusting, via a power factor correction circuit, a power factor of the DC power and outputting voltage of the DC power to a display,
wherein the method further comprises:
identifying, via a processor, power consumed by the display; and
turning on or off the power factor correction circuit, via the processor, based on the identified power consumption of the display,
wherein, when the power factor correction circuit is turned off, power received via the power receiver is input to the display via a first rectifying circuit included in the rectifier, and
wherein, when the power factor correction circuit is turned on, power received via the power receiver is input to the display via a second rectifying circuit and the power factor correction circuit, the second rectifying circuit being included in the rectifier.

* * * * *